(12) United States Patent
He (10) Patent No.: US 11,120,240 B2
(45) Date of Patent: Sep. 14, 2021

(54) AUTO-EXPOSURE REGION AUTO-CORRECTION

(71) Applicant: ZEBRA TECHNOLOGIES CORPORATION, Lincolnshire, IL (US)

(72) Inventor: Duanfeng He, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 34 days.

(21) Appl. No.: 16/592,672

(22) Filed: Oct. 3, 2019

(65) Prior Publication Data

US 2021/0103712 A1   Apr. 8, 2021

(51) Int. Cl.
*G06K 7/14* (2006.01)
*G06K 7/10* (2006.01)

(52) U.S. Cl.
CPC ....... *G06K 7/1465* (2013.01); *G06K 7/10732* (2013.01); *G06K 7/10752* (2013.01); *G06K 7/146* (2013.01); *G06K 7/1473* (2013.01)

(58) Field of Classification Search
None
See application file for complete search history.

(56) References Cited

U.S. PATENT DOCUMENTS

| | | | |
|---|---|---|---|
| 9,800,749 B1* | 10/2017 | Tan | H04N 5/20 |
| 2001/0003346 A1* | 6/2001 | Feng | G06K 7/10732 235/472.01 |
| 2009/0001163 A1* | 1/2009 | Barkan | G06K 7/10752 235/454 |
| 2010/0147947 A1* | 6/2010 | Aker | G06K 7/1465 235/454 |
| 2012/0000982 A1* | 1/2012 | Gao | G06K 7/146 235/455 |
| 2013/0248602 A1* | 9/2013 | He | G06K 7/10752 235/455 |

\* cited by examiner

*Primary Examiner* — Christle I Marshall
(74) *Attorney, Agent, or Firm* — Yuri Astvatsaturov (57) ABSTRACT

A method and apparatus for correcting auto-exposure settings of a barcode reader based on modifying an auto-exposure region at a barcode reader for decoding a barcode in response to identifying a barcode and failing to decode the barcode due to incorrect initial exposure parameters, wherein the modified auto-exposure region is based at least in part on the barcode location.

20 Claims, 8 Drawing Sheets

AUTO-EXPOSURE REGION AUTO-CORRECTION

FIELD OF THE INVENTION

At least some embodiments of the present invention generally relate to devices, systems, and methods associated with optical data capture, and more specifically to devices, systems, and methods for illuminating barcodes and capturing barcode data.

BACKGROUND OF THE INVENTION

Some barcode readers utilize one or more auto-exposure settings during scanning to correct for environmental factors when decoding a barcode. These auto-exposure settings are often calculated based on analyzing pixels within an auto-exposure region determined by the barcode reader. However, the auto-exposure settings may be incorrectly calculated if, for example, a barcode is not within the auto-exposure region or the auto-exposure region is too small or too large compared to the barcode. If the auto-exposure settings are incorrect, a barcode reader may not be able to decode an indicia even if the indicia is captured by the barcode reader. Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

In an embodiment, a method of correcting auto-exposure is described. The method includes: receiving an image from an imaging assembly, the image being captured over a field of view (FOV) and according to at least one initial exposure parameter; identifying an indicia within the image, the indicia having a location within the image; attempting to decode the indicia; responsive to not being able to decode the indicia, determining an auto-exposure region within the image, the auto-exposure region corresponding to a first region within the FOV and being based on the location of the indicia; determining at least one subsequent exposure parameter based on image data within the auto-exposure region; and responsive to the first region within the FOV being within a predetermined proximity to a second region within the FOV, causing the imaging assembly to capture a subsequent image, the subsequent image being captured according to the at least one subsequent exposure parameter.

The second region within the FOV may contain at least a portion of a line extending between a near point within the FOV and a far point within the FOV, wherein: the near point corresponds to a near location of an aiming pattern on a near imaging plane of the field of view, the far point corresponds to a far location of the aiming pattern on a far imaging plane of the field of view, and the near imaging plane is closer to the imaging assembly than the far imaging plane.

The auto auto-exposure region may include at least a portion of the indicia. The at least one initial exposure parameter may be based on at least one of an ambient illumination level, a distance of an object being captured by the imaging assembly, a color of the object being captured by the imaging assembly, and a color of the indicia; and the at least one subsequent exposure parameter may be further determined based on the at least one initial exposure parameter. Each of the at least one initial exposure parameters may be one of a focus of the imaging assembly, a white balance correction, an exposure time, and a level of illumination; and each of the at least one subsequent exposure parameters may be one of the focus of the imaging assembly, the white balance correction, the exposure time, and the level of illumination.

The image data may include brightness and contrast. The auto-exposure region may be less than one percent of the size of the image.

In another embodiment, another method of correcting auto-exposure is described. The method includes: receiving an image from an imaging assembly, the image being captured over a field of view (FOV) and according to at least one initial exposure parameter; identifying an indicia within the image, the indicia having a location within the image; attempting to decode the indicia; responsive to not being able to decode the indicia, determining an auto-exposure region within the image, the auto-exposure region corresponding to a first region within the FOV and being based on the location of the indicia; responsive to the first region within the FOV being within a predetermined proximity to a second region within the FOV, determining at least one subsequent exposure parameter based on image data within the auto-exposure region; and causing the imaging assembly to capture a subsequent image, the subsequent image being captured according to the at least one subsequent exposure parameter.

The auto-exposure region may be less than five percent of the size of the image.

In yet another embodiment, an apparatus for correcting auto-exposure is described. The apparatus includes: a housing; an imaging assembly configured to capture an image over a field of view (FOV) and according to at least one initial exposure parameter; a controller communicatively coupled to the imaging assembly and configured to: identify an indicia within the image, the indicia having a location within the image; attempt to decode the indicia; responsive to not being able to decode the indicia, determine an auto-exposure region within the image, the auto-exposure region corresponding to a first region within the FOV and being based on the location of the indicia; and determine at least one subsequent exposure parameter based on image data within the auto-exposure region for use in one or more subsequent captures of images.

The imaging apparatus may be further configured capture a subsequent image according to the at least one subsequent exposure parameter.

Figure 1:
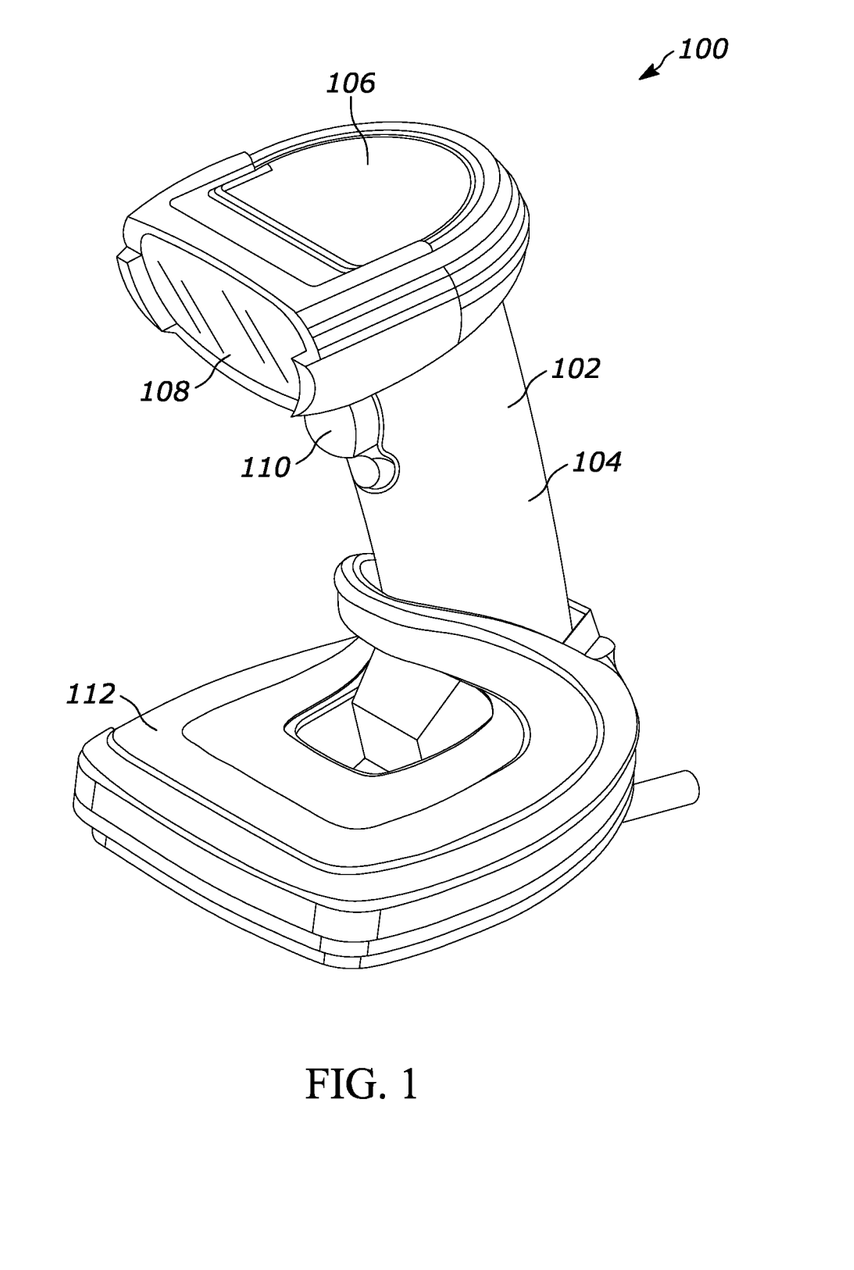
FIG. 1 illustrates a perspective view of a barcode reader according to an embodiment.

Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a user (not shown) and includes a trigger 110 for activation by the user. Included in the embodiment is also a base 112 attached to the handle portion 104 opposite the head portion 106. The base 112 is configured to stand on a surface and support the housing 102 in a generally upright position. The barcode reader 100 can be used in a hands-free mode as a stationary workstation when it is placed on the countertop. The barcode reader 100 can also be used in a handheld mode when it is picked up off the countertop and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode. In some implementations, the base 112 can be omitted, and the housing 102 can also be in other handheld shapes. Other implementations may provide only handheld or only hands-free configurations.

Figure 2:
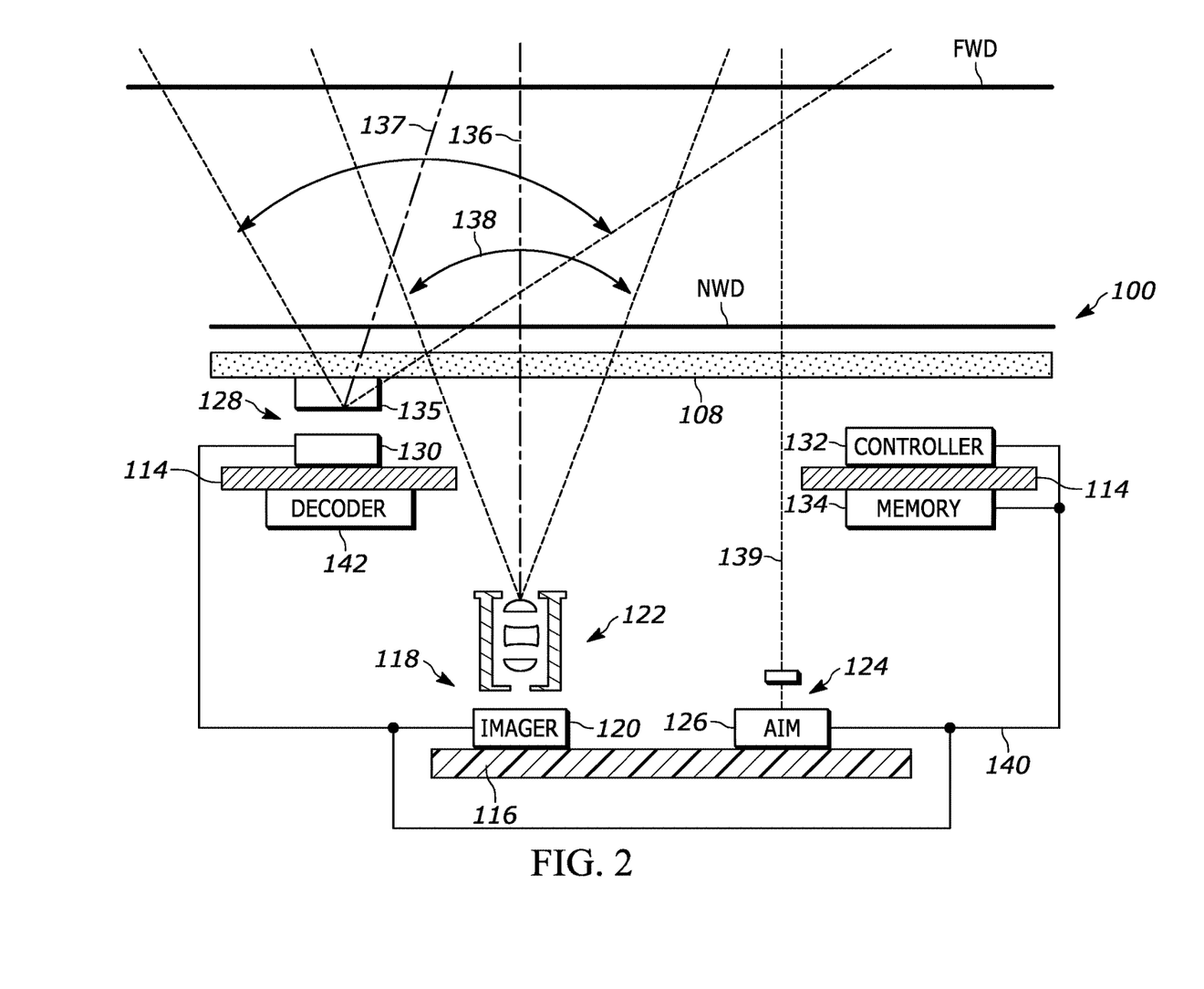
FIG. 2 illustrates a block schematic diagram some of the components of the barcode reader of FIG. 1.

FIG. 2 illustrates a block schematic diagram of a portion of the barcode reader 100 in accordance with some embodiments. It should be understood that FIG. 2 is not drawn to scale. The barcode reader 100 in FIG. 2 includes: (1) a first circuit board 114; (2) a second circuit board 116; (3) an imaging assembly 118 that includes an imaging sensor 120, and an imaging lens assembly 122; (4) an aiming assembly 124 that includes an aiming light source 126; (5) an illumination assembly 128 that includes an illumination light source 130; (6) a controller 132; and (7) a memory 134.

The imaging sensor 120 can be either CCD or CMOS imaging sensors that generally include multiple photosensitive pixel elements aligned in one-dimensional array for linear sensors or two-dimensional array for two-dimensional sensors. The imaging sensor 120 is operative to detect light captured by the imaging assembly 118 along an optical path or central field of view (FOV) axis 136 through the window 108. Generally, the image sensor 120 and imaging lens assembly 122 pair is designed to operate together for capturing light scattered, reflected, or emitted from a barcode as pixel data over a one-dimensional or two-dimensional FOV 138 that extends between a near working distance (NWD) and a far working distance (FWD). NWD and FWD denote the distances between which the imaging assembly 118 is designed to read barcodes. In some embodiments, the NDW is between approximately 0 and approximately 2 centimeters from the nose 158 and the FWD is between approximately 25 and approximately 150 inches from the nose 158.

The imaging sensor 120 is operated by the controller 132, such as a microprocessor, that is communicatively connected thereto. Additionally, the controller 132 is communicatively connected to the aim light source 126, illumination light source 130, and memory 134. Although the link between these components is illustrated as a single communication bus 140, this is merely illustrative, and any communication link between any of the devices may either be dedicated or may include more than the two selected devices. Additionally, placement of components on either side of any of the circuit boards is similarly exemplary. In operation, the memory 134 can be accessible by the controller 126 for storing and retrieving data. In some embodiments, the first circuit board 114 also includes a decoder 142 for decoding one or more barcodes that are captured by the imaging sensor 120. The decoder 142 can be implemented within the controller 132 or as a separate module 142.

The imaging sensor 120 may detect light captured by the imaging assembly 118 in accordance with exposure parameters. The exposure parameters may be based on at least one of ambient illumination level, a distance of an object being captured by the imaging sensor 120, a color of an object being captured by the imaging sensor 120, and a color of a barcode on an object being captured by the imaging sensor 120 wherein the barcode is to be decoded by the decoder 142. Further, the exposure parameters may be a focus of the imaging assembly 118, a white balance correction of the imaging sensor 120, and a level of illumination provided by the illumination light source 130. The exposure parameters may be determined from an auto-exposure region wherein the auto-exposure region is less than one percent of the size of the field of view 138 or less than five percent the size of the field of view 138. The exposure parameters may be stored at the memory 134. An image captured by the imaging sensor may comprise image data including a brightness of the image and a contrast of the image. Image data may be determined at the decoder 142 or the controller 132.

As indicated above, the illumination light source 130 is communicatively connected to the controller 132, and is activated by the controller 132 in response to a user actuating the trigger 110 in a handheld mode. In a handsfree mode, the controller 132 may continuously activate the illumination light source 130. The illumination light source 130 is operative to emit light through the window 108 along an optical path or central illumination axis 137 through the window 108. In an embodiment, the illumination light source 130 is vertically offset from the imaging sensor 120. In another embodiment, in order to avoid directing an intense amount of light at the middle of a barcode and over-saturating the barcode, the barcode reader has two illumination light sources, each horizontally offset to either side of the imaging sensor 120.

Figure 3:
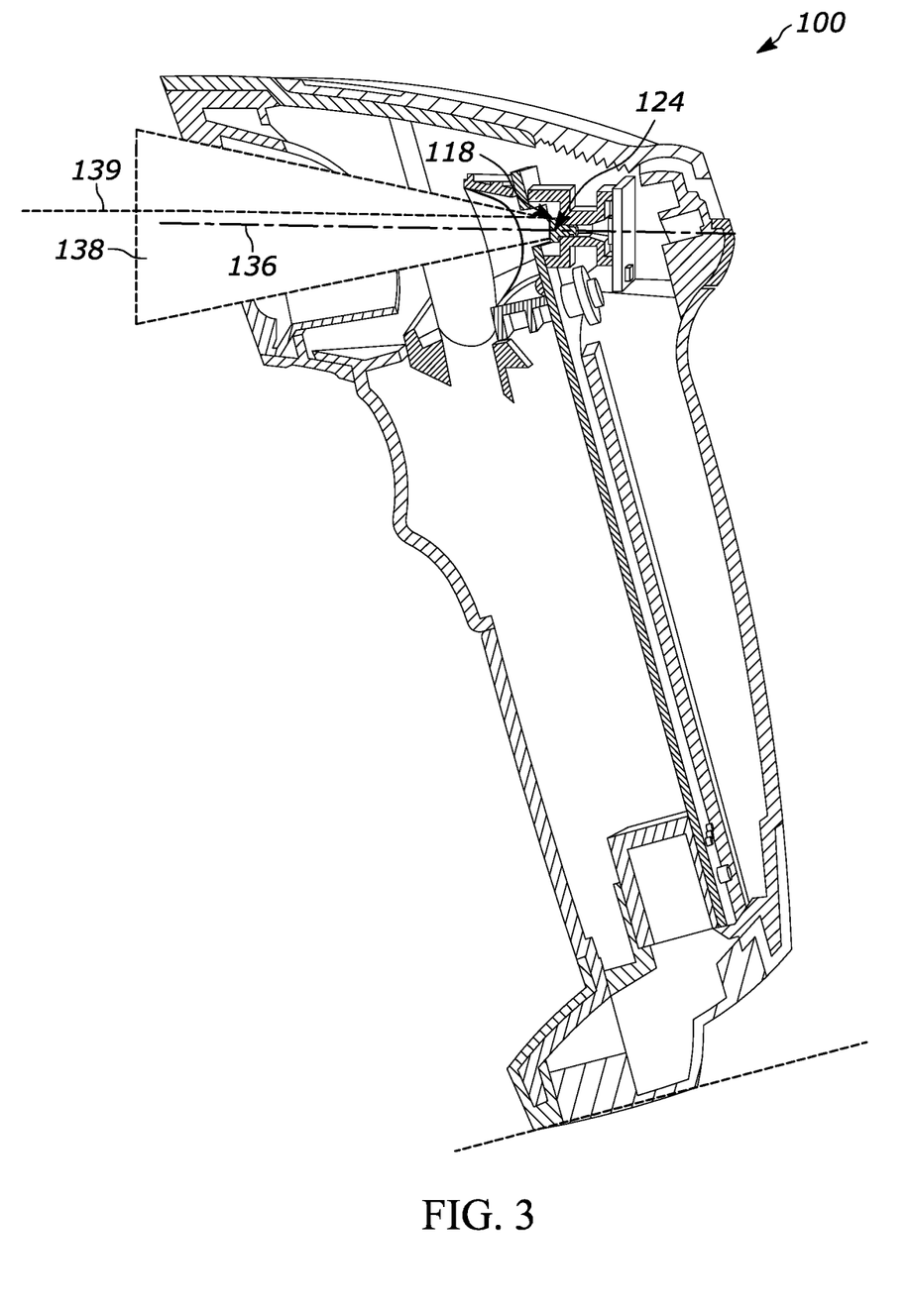
FIG. 3 illustrates a side perspective cut-away view of a barcode reader in accordance with an embodiment.

As indicated above the aiming light source 126 is communicatively connected to the controller 132. The aiming light source 126 and aiming assembly 124 are operative to emit light in the form of an aiming pattern through the window 108 along the aiming path or central aiming axis 139, The aiming pattern is defined by the central aiming axis 139. A user of the scanner 100 may use the aiming pattern as a guide bring a barcode into the FOV 138 such that the barcode is captured. In a handsfree mode, the controller 132 may cease activation of the aiming light source 126 immediately subsequent to capture of an image at the imaging sensor 120. In a handheld mode, the controller may cease activation of the aiming light source 126 in response activating the trigger 110 such that the aiming pattern does not interfere with image capture. As shown in FIG. 3, the aiming assembly 124 is offset from the imaging assembly 118 resulting in an off-axis configuration of the central aiming axis 139 and the FOV 138 including the central FOV axis 136.

The illumination light source 130 is provided on the first circuit board 114, whereas the imaging sensor 120 is provided on the second circuit board 116. However, in some embodiments, the illumination light source 130 and the imaging sensor 120 are provided on the same circuit board. The optical element 135 may be any optical element that redirects light emitted by the illumination light source 130, and, more particularly, redirects the central illumination axis 137 of the illumination light source 130 with little to no magnification of the light. In some embodiments, the optical element 135 is a prism, such as a deflecting prism, though the optical element 135 may also be a mirror, a series of mirrors, optical waveguide(s), etc. Where the optical element 135 is an optical waveguide, it will be understood that an optical waveguide restricts the spatial range in which the light can propagate using a region having an increased refractive index as compared to the surrounding medium. Examples of suitable optical waveguides include, but are not limited to, single mode optical fiber, channel waveguides, planar waveguides, and strip waveguides. Preferably, the optical element does not magnify, or only minimally magnifies, the illumination light from the illumination light source 130 in order to avoid specular reflections off the barcode. In an embodiment, the optical element 135 provides an optical magnification of less than 1.5×, where the magnification of the optical element 135 is measured as: $M=f/(f-d_0)$, where f is the focal length of the optical element 135, and do is the distance between the optical element 135 and the illumination light source 130.

The optical element 135 is preferably made of a low dispersion material having an Abbe number of at least 40, so as to maintain the wavelength of the light emitted by the illumination light source 130 (e.g., 620-660 nanometers). The Abbe number is a measure of the material's wavelength dispersion (with high values indicating low dispersion). Examples of low dispersion materials include, but are not limited to, poly(methyl methacrylate) (PMMA), crown material (e.g., crown glass, crown plastic), cyclo olefin polymer, acrylic, and polycarbonate).

In an embodiment, the optical element 135 is adhered, or otherwise affixed, to the window 108. In a different embodiment, the window 108 may be molded such that the optical element 135 is integral with the window 108. In yet another embodiment in which the barcode reader 100 has two illumination sources, an optical element 135 may be provided for each illumination light source. In a different embodiment in which the barcode reader 100 has two illumination light sources, the optical elements 135 may be integral with one another, such as a single prism extending in width to each of the illumination light sources.

Figure 4:
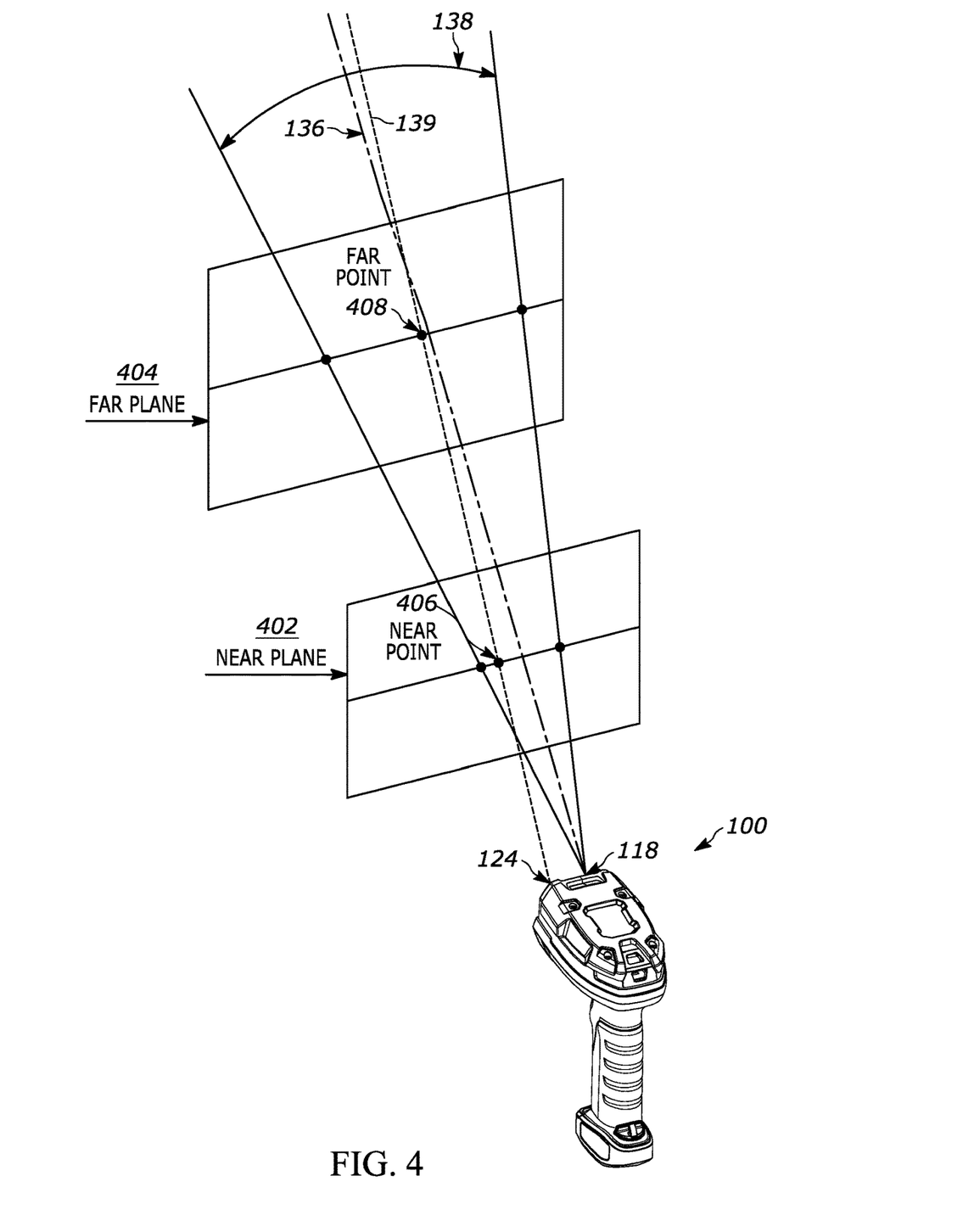
FIG. 4 illustrates a projection of an aiming pattern and a field of view of a barcode reader on a near plane and on a far plane, according to an embodiment.

Referring now to FIG. 4, shown therein is a barcode reader 100 with an exemplary component arrangement. In this arrangement, the reader 100 includes the imaging assembly 118 and the aiming assembly 124. The imaging assembly 118 is configured such that the imaging sensor 120 is operable to capture image data over the FOV 138, wherein the FOV 138 includes central FOV axis 136. The aiming assembly 124 is configured to provide an aiming pattern including a central point along the central aiming axis 139. The reader 100 is calibrated using a near point 406 and a far point 408. When the reader 100 is pointed at a near plane 402, the central point of the aiming pattern appears at near point 406. Similarly, when the reader 100 is pointed at a parallel far plane 404, the central point of the aiming pattern appears at far 408. The movement of the aiming pattern between near plane 402 and far plane 404 results from the off-axis configuration of the imaging assembly 118 and the aiming assembly 124. The near plane 402 and the far plane 404 may be perpendicular to the central aiming axis 139 and the near plane 402 may be closer to the reader 100 than the far plane 404.

Figure 5:
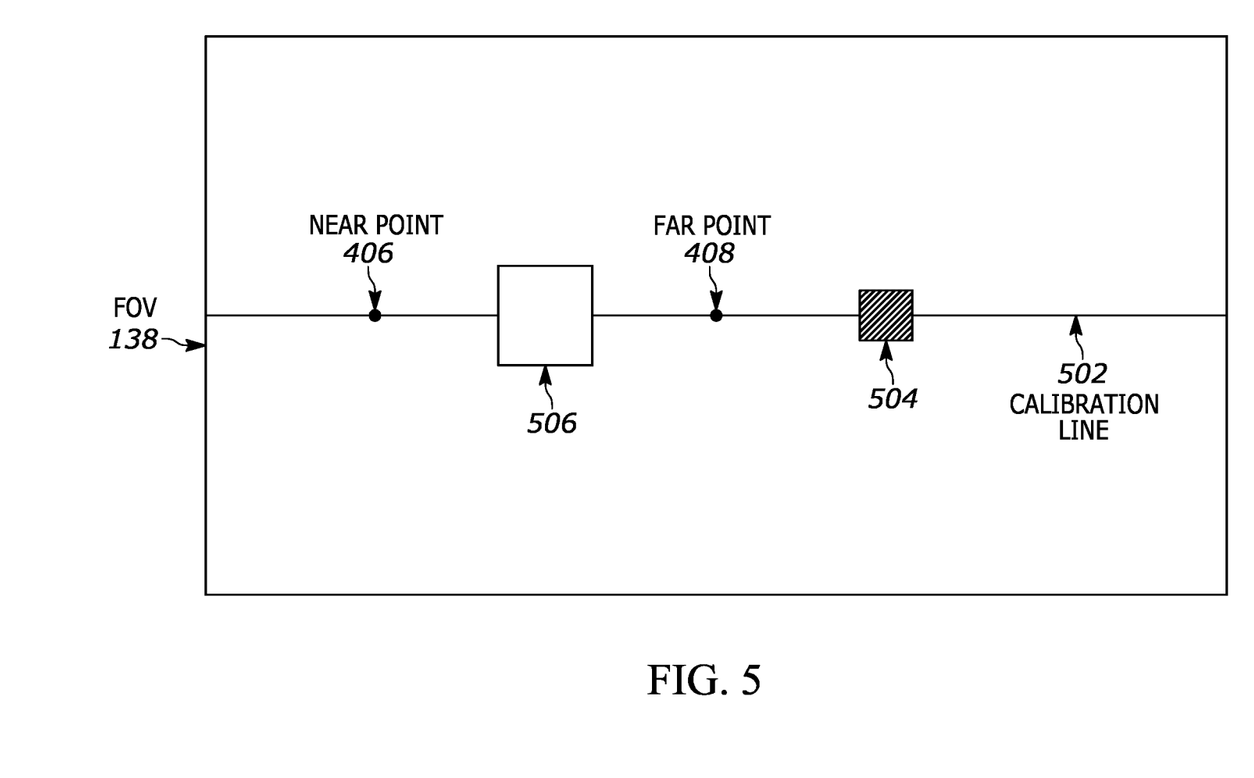
FIG. 5 illustrates a field of view of a barcode reader including an auto-exposure region that does not encompass a barcode, according to an embodiment.
Figure 6:
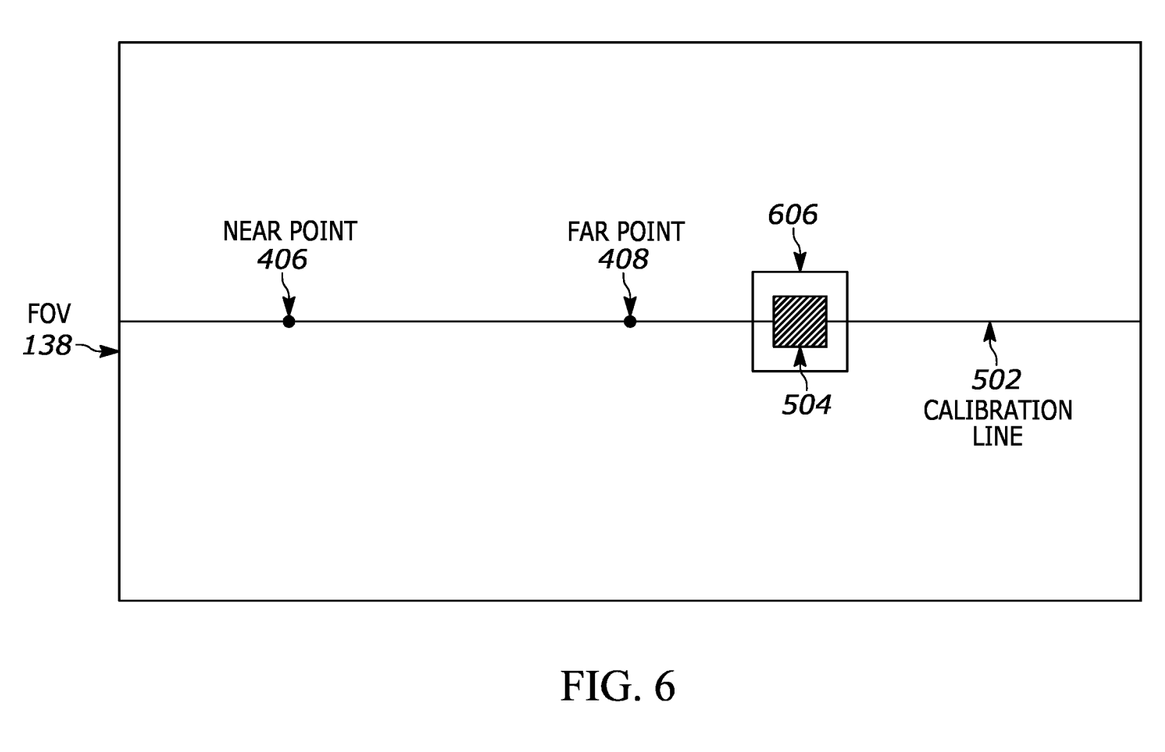
FIG. 6 illustrates a field of view of a barcode reader including an auto-exposure region that encompasses a barcode, according to an embodiment.

Referring to FIGS. 5 and 6 which respectively illustrate a field of view 138 including the near point 406 and the far point 408, the near point 406 and the far point 408 define a calibration line 502. The field of view 138 may contain at least a portion of the calibration line 502. While the reader 100 is calibrated, the aiming pattern including a central point along the central aiming axis 139 appears on or near the calibration line 502.

Reader 100 may be configured according to an auto-exposure region 506. The controller 132 and/or the decoder 142 may determine auto-exposure settings based on the auto-exposure region. The auto-exposure settings may be determined from the pixels within an image captured by the imaging assembly 118. The auto-exposure settings may alter the behavior of the imaging assembly 118 and the illumination assembly 128.

As described in FIG. 5, the field of view 138 of the reader 100 may encompass a barcode 504 but the auto-exposure region 506 may not encompass the barcode 504. The controller 132 and/or the decoder 142 may set auto-exposure parameters for capturing and decoding the barcode 504 based on the auto-exposure region 506. As a result, the decoder may not properly decode the barcode 504. The controller 132 and/or the decoder 142 may also incorrectly determine auto-exposure settings if the auto-exposure region 506 is too small or too large compared to the barcode 504.

As described in FIG. 6, If the controller 132 and/or the detector 142 determine that the barcode 504 is located within the field of view 138, the controller and/or the detector may determine a new auto-exposure region 606. The controller 132 and/or the decoder 142 may set new auto-exposure parameters for capturing and decoding the barcode 504 based on the auto-exposure region 606. As a result, the decoder may properly decode the barcode 504. Optionally, at least one new auto-exposure parameter may be based on the initial auto-exposure parameters. If the controller 132 and/or detector 142 detect an indicia that appears to be a barcode but does not appear on or near calibration line 502, the controller 132 and/or detector 142 may determine the indicia is not a proper barcode.

Figure 7:
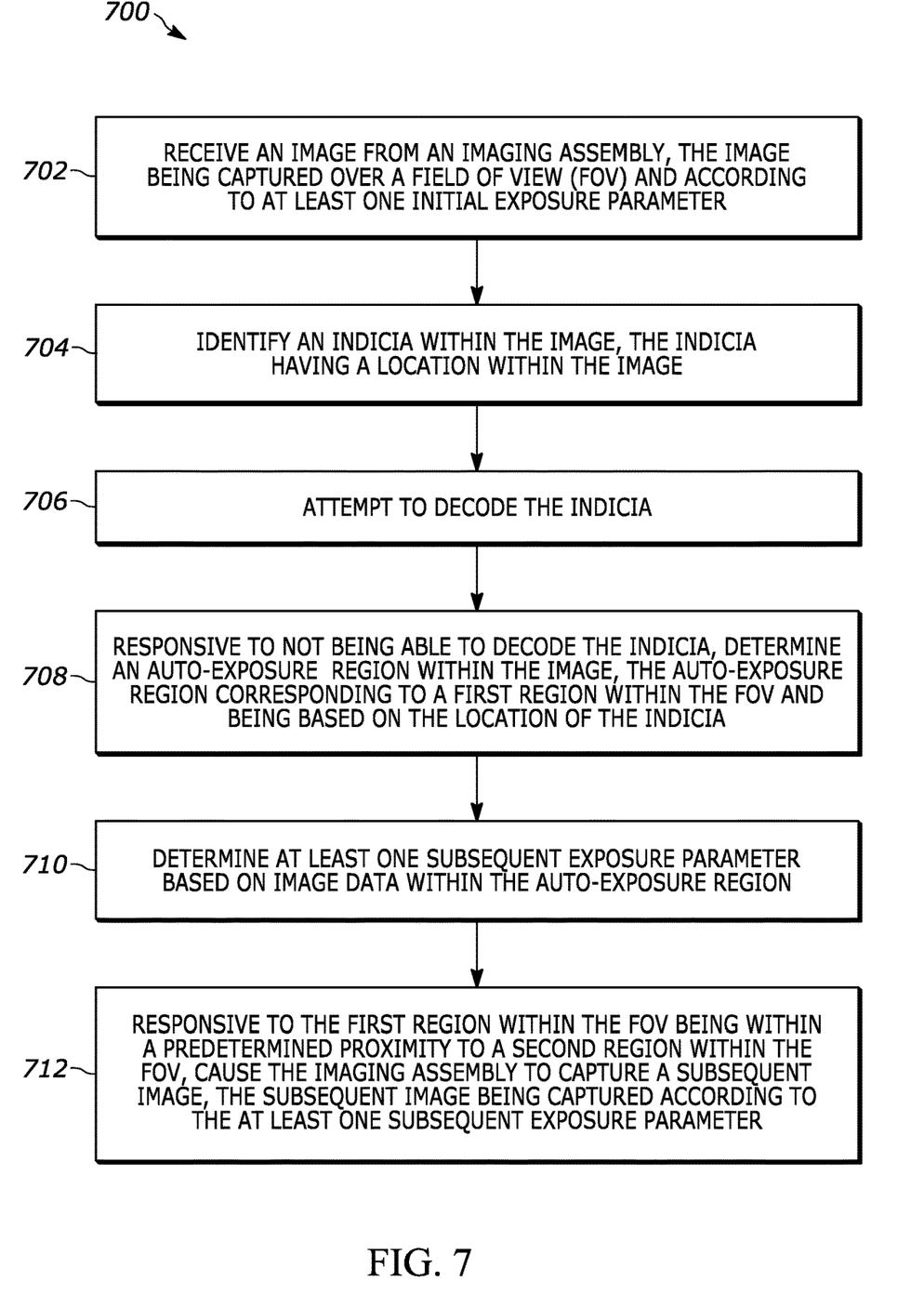
FIG. 7 illustrates a flow diagram of an exemplary auto-exposure correction method, according to an embodiment.

As shown in the flow chart 700 of FIG. 7, the method is performed in step 702 by receiving at a controller 132 an image from an imaging assembly 118, the image being captured over a FOV 138 and according to at least one initial exposure parameter. The image may be captured by the imaging assembly 118. The initial exposure parameter may be based on at least one of an ambient illumination level of the FOV 138, a distance of an object being captured by the imaging assembly 118, a color of the object being captured by the imaging assembly 118, and a color of a barcode 504 on an object being captured by the imaging sensor 120 wherein the barcode is to be decoded by the decoder 142. Further, the initial exposure parameter may be a focus of the imaging assembly 118, a white balance correction of the imaging sensor 120, and/or a level of illumination provided by the illumination light source 130. Next, the controller 132 identifies an indicia within the image, the indicia having a location within the image at step 704 and the controller 132 and/or the decoder 142 attempt to decode the indicia at step 706.

At step 708, responsive to not being able to decode the indicia 504, the controller 132 determines an auto-exposure region within the image, the auto-exposure region corresponding to a first region within the FOV 138 and being based on the location of the indicia. The auto-exposure region may include at least a portion of the indicia. The auto-exposure region may be less than one percent of the size of the image or less than five percent of the size of the image. At step 710, the controller 132 determines at least one subsequent exposure parameter based on image data within the auto-exposure region. The at least one subsequent exposure parameter may be further determined by the controller 138 based on at least on initial exposure parameter. Further, the subsequent exposure parameter may be a focus of the imaging assembly 118, a white balance correction of the imaging sensor 120, and/or a level of illumination provided by the illumination light source 130. The image data may include brightness and contrast.

Responsive to the first region within the FOV 138 being within a predetermined proximity to a second region within the FOV 138, the controller 132 may cause the imaging assembly to capture a subsequent image, the subsequent image being captured according to the at least one subsequent exposure parameter, at step 712. The second region within the FOV may contain at least a portion of a line 502 extending between a near point 406 and a far point 408 within the FOV 138.

Figure 8:
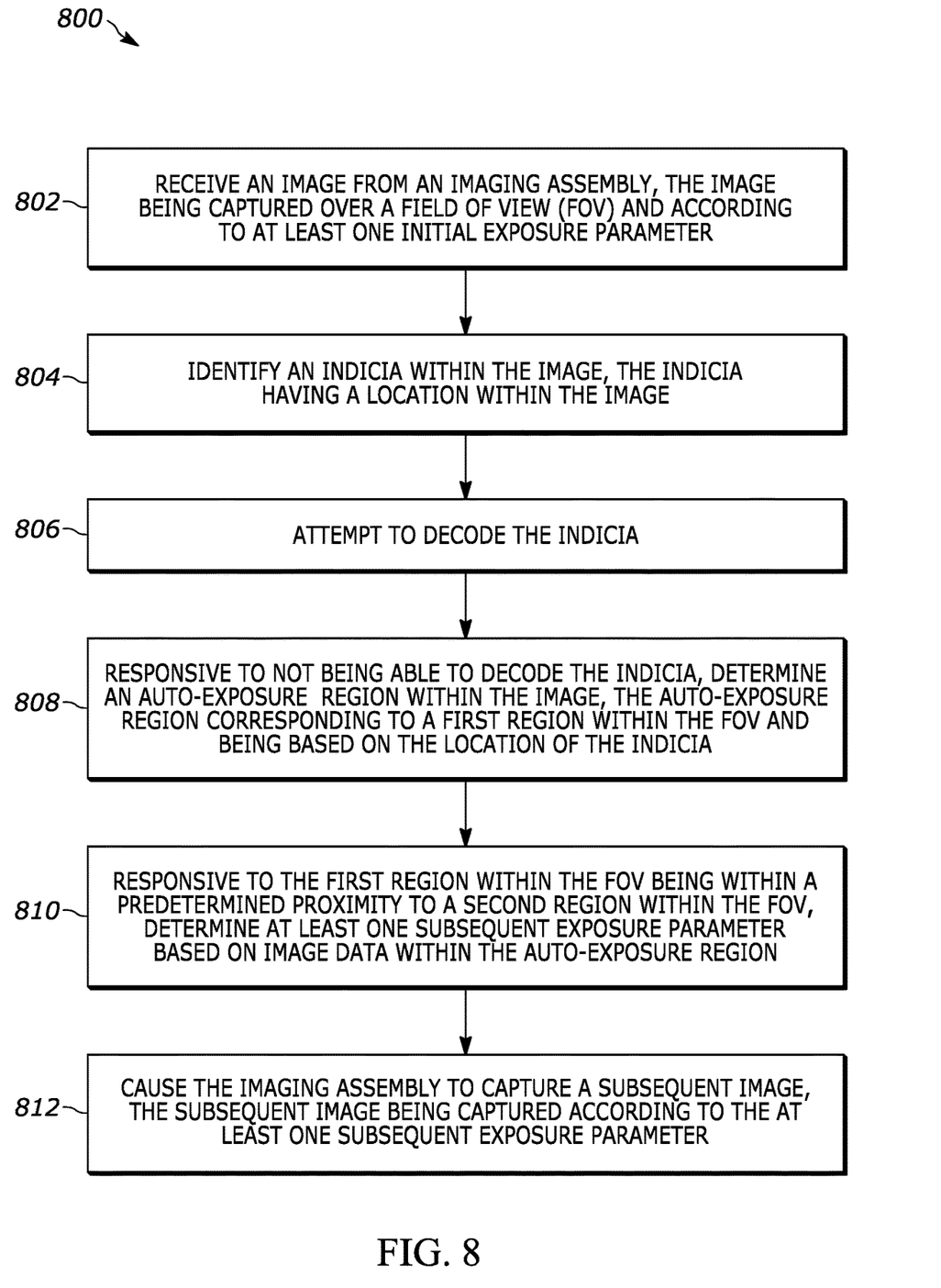
FIG. 8 illustrates a flow diagram of another exemplary auto-exposure correction method, according to another embodiment.

As shown in the flow chart 800 of FIG. 8, the method is performed in step 802 by receiving at a controller 132 an image from an imaging assembly 118, the image being captured over a FOV 138 and according to at least one initial exposure parameter. The image may be captured by the imaging assembly 118. The initial exposure parameter may be based on at least one of an ambient illumination level of the FOV 138, a distance of an object being captured by the imaging assembly 118, a color of the object being captured by the imaging assembly 118, and a color of a barcode 504 on an object being captured by the imaging sensor 120 wherein the barcode is to be decoded by the decoder 142. Further, the initial exposure parameter may be a focus of the imaging assembly 118, a white balance correction of the imaging sensor 120, and/or a level of illumination provided by the illumination light source 130. Next, the controller 132 identifies an indicia within the image, the indicia having a location within the image at step 804 and the controller 132 and/or the decoder 142 attempt to decode the indicia at step 806.

At step 808, responsive to not being able to decode the indicia 504, the controller 132 determines an auto-exposure region within the image, the auto-exposure region corresponding to a first region within the FOV 138 and being based on the location of the indicia. The auto-exposure region may include at least a portion of the indicia. The auto-exposure region may be less than one percent of the size of the image or less than five percent of the size of the image.

At step 810, responsive to the first region within the FOV 138 being within a predetermined proximity to a second region within the FOV 138 the controller 132 determines at least one subsequent exposure parameter based on image data within the auto-exposure region. The second region within the FOV may contain at least a portion of a line 502 extending between a near point 406 and a far point 408 within the FOV 138. The at least one subsequent exposure parameter may be further determined by the controller 138 based on at least on initial exposure parameter. Further, the subsequent exposure parameter may be a focus of the imaging assembly 118, a white balance correction of the imaging sensor 120, and/or a level of illumination provided by the illumination light source 130. The image data may include brightness and contrast. The controller 132 may cause the imaging assembly to capture a subsequent image, the subsequent image being captured according to the at least one subsequent exposure parameter at step 812.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of correcting auto-exposure, the method comprising:
   receiving an image from an imaging assembly, the image being captured over a field of view (FOV) and according to at least one initial exposure parameter;
   identifying an indicia within the image, the indicia having a location within the image;
   attempting to decode the indicia;
   responsive to not being able to decode the indicia, determining an auto-exposure region within the image, the auto-exposure region corresponding to a first region within the FOV and being based on the location of the indicia;
   determining at least one subsequent exposure parameter based on image data within the auto-exposure region; and
   responsive to the first region within the FOV being within a predetermined proximity to a second region within the FOV, causing the imaging assembly to capture a subsequent image, the subsequent image being captured according to the at least one subsequent exposure parameter.

2. The method of claim 1, wherein the second region within the FOV contains at least a portion of a line extending between a near point within the FOV and a far point within the FOV, wherein:
   the near point corresponds to a near location of an aiming pattern on a near imaging plane of the field of view,
   the far point corresponds to a far location of the aiming pattern on a far imaging plane of the field of view, and
   the near imaging plane is closer to the imaging assembly than the far imaging plane.

3. The method of claim 1, wherein the auto-exposure region includes at least a portion of the indicia.

4. The method of claim 1, wherein:
   the at least one initial exposure parameter is based on at least one of an ambient illumination level, a distance of an object being captured by the imaging assembly, a color of the object being captured by the imaging assembly, and a color of the indicia; and
   the at least one subsequent exposure parameter is further determined based on the at least one initial exposure parameter.

5. The method of claim 1, wherein:
   each of the at least one initial exposure parameters is one of a focus of the imaging assembly, a white balance correction, an exposure time, and a level of illumination; and
   each of the at least one subsequent exposure parameters is one of the focus of the imaging assembly, the white balance correction, the exposure time, and the level of illumination.

6. The method of claim 1, wherein the image data includes brightness and contrast.

7. The method of claim 1 wherein the auto-exposure region is less than one percent of the size of the image.

8. A method of correcting auto-exposure, the method comprising:
   receiving an image from an imaging assembly, the image being captured over a field of view (FOV) and according to at least one initial exposure parameter;
   identifying an indicia within the image, the indicia having a location within the image;
   attempting to decode the indicia;
   responsive to not being able to decode the indicia, determining an auto-exposure region within the image, the auto-exposure region corresponding to a first region within the FOV and being based on the location of the indicia;
   responsive to the first region within the FOV being within a predetermined proximity to a second region within the FOV, determining at least one subsequent exposure parameter based on image data within the auto-exposure region; and
   causing the imaging assembly to capture a subsequent image, the subsequent image being captured according to the at least one subsequent exposure parameter.

9. The method of claim 8, wherein the second region within the FOV contains at least a portion of a line extending between a near point within the FOV and a far point within the FOV, wherein:
   the near point corresponds to a near location of an aiming pattern on a near imaging plane of the field of view,
   the far point corresponds to a far location of the aiming pattern on a far imaging plane of the field of view, and the near imaging plane is closer to the imaging assembly than the far imaging plane.

10. The method of claim 8, wherein the auto-exposure region includes at least a portion of the indicia.

11. The method of claim 8, wherein:
the at least one initial exposure parameter is based on at least one of an ambient illumination level, a distance of an object being captured by the imaging assembly, a color of the object being captured by the imaging assembly, and a color of the indicia; and
the at least one subsequent exposure parameter is further determined based on the at least one initial exposure parameter.

12. The method of claim 8, wherein:
each of the at least one initial exposure parameters is one of a focus of the imaging assembly, a white balance correction, an exposure time, and a level of illumination; and
each of the at least one subsequent exposure parameters is one of the focus of the imaging assembly, the white balance correction, the exposure time, and the level of illumination.

13. The method of claim 8, wherein the image data includes brightness and contrast.

14. The method of claim 8, wherein auto-exposure region is less than five percent of the size of the image.

15. An apparatus for correcting auto-exposure, the apparatus comprising:
a housing;
an imaging assembly configured to capture an image over a field of view (FOV) and according to at least one initial exposure parameter;
a controller communicatively coupled to the imaging assembly and configured to:
identify an indicia within the image, the indicia having a location within the image;
attempt to decode the indicia;
responsive to not being able to decode the indicia, determine an auto-exposure region within the image, the auto-exposure region corresponding to a first region within the FOV and being based on the location of the indicia; and
determine at least one subsequent exposure parameter based on image data within the auto-exposure region for use in one or more subsequent captures of images.

16. The apparatus of claim 15, wherein the imaging apparatus is further configured capture a subsequent image according to the at least one subsequent exposure parameter.

17. The apparatus of claim 15, wherein the second region within the FOV contains at least a portion of a line extending between a near point within the FOV and a far point within the FOV, wherein:
the near point corresponds to a near location of an aiming pattern on a near imaging plane of the field of view,
the far point corresponds to a far location of the aiming pattern on a far imaging plane of the field of view, and
the near imaging plane is closer to the imaging assembly than the far imaging plane.

18. The apparatus of claim 15, wherein the auto-exposure region includes at least a portion of the indicia.

19. The method of claim 15, wherein the image data includes brightness and contrast.

20. The method of claim 15, wherein:
each of the at least one initial exposure parameters is one of a focus of the imaging assembly, a white balance correction, an exposure time, and a level of illumination; and
each of the at least one subsequent exposure parameters is one of the focus of the imaging assembly, the white balance correction, the exposure time, and the level of illumination.

* * * * *